United States Patent
Duhon

(10) Patent No.: US 6,543,280 B2
(45) Date of Patent: Apr. 8, 2003

(54) REMOTE SENSING AND MEASUREMENT OF DISTANCES ALONG A BOREHOLE

(75) Inventor: Gerard J. Duhon, Leroy, LA (US)

(73) Assignee: Inertial Response, Inc., Sugarland, TX (US)

( * ) Notice: Subject to any disclaimer, the term of this patent is extended or adjusted under 35 U.S.C. 154(b) by 105 days.

(21) Appl. No.: 09/898,393

(22) Filed: Jul. 3, 2001

(65) Prior Publication Data

US 2002/0032529 A1 Mar. 14, 2002

Related U.S. Application Data

(60) Provisional application No. 60/216,730, filed on Jul. 7, 2000.

(51) Int. Cl.$^7$ ................ E21B 47/00; E21B 43/119; E21B 49/00; G01V 5/00; G01V 1/40
(52) U.S. Cl. ................ 73/152.01; 73/152.54; 73/152.02; 166/254.1; 166/255.1; 702/6
(58) Field of Search .............. 73/152.01, 152.02, 73/152.54, 152.45; 166/254.1, 254.2, 255.1; 175/40; 702/6

(56) References Cited

U.S. PATENT DOCUMENTS

| | | | |
|---|---|---|---|
| 2,629,257 A | 2/1953 | Link ................ 73/151 |
| 2,894,200 A | * 7/1959 | Szasz ............... 324/10 |
| 3,538,761 A | * 11/1970 | Horton et al. ........ 73/133 |
| 4,040,002 A | 8/1977 | Durand .............. 340/18 DC |
| 4,396,836 A | 8/1983 | Vitaliani et al. ...... 250/223 R |
| 4,468,959 A | * 9/1984 | Roberts ............. 73/152.01 |
| 4,545,242 A | 10/1985 | Chan ................ 73/152 |
| 4,787,244 A | 11/1988 | Mikolajczyk ......... 73/151 |
| 5,019,978 A | 5/1991 | Howard, Jr. et al. ... 364/422 |
| 5,551,286 A | * 9/1996 | Booer ............... 73/152.45 |
| 5,581,024 A | * 12/1996 | Meyer, Jr. et al. .... 73/152.03 |
| 5,626,192 A | 5/1997 | Connell et al. ....... 166/255.1 |
| 5,753,813 A | 5/1998 | Hagiwara ............ 73/152.54 |
| 6,151,961 A | 5/2000 | Huber et al. ......... 73/152.54 |
| 6,333,699 B1 | 12/2001 | Zierolf .............. 340/854.8 |
| 6,333,700 B1 | 12/2001 | Thomeer et al. ...... 340/854.8 |

* cited by examiner

Primary Examiner—Daniel S. Larkin
Assistant Examiner—David J. Wiggins
(74) Attorney, Agent, or Firm—Luedeka, Neely & Graham, P.C.

(57) ABSTRACT

A borehole probe and related method and apparatus that enables information related to the depth of the probe to be determined and utilized by the probe to perform tasks. The probe, comparing its sense of depth and other sensed physical and temporal information to pre-defined procedural and conditional constraints, causes a physical action to be performed, or signals another device, or signals the surface. Generally, the probe uses sensed benchmarks within the borehole that have an associated depth as a depth framework. Within the distances between the benchmarks, the probe uses inertial or other distance measuring devices to measure distance from the benchmarks. With accurate and constant knowledge of its own depth, the probe can perform tasks autonomously and at the correct depth.

7 Claims, 8 Drawing Sheets

FIG. 6
FIG. 7
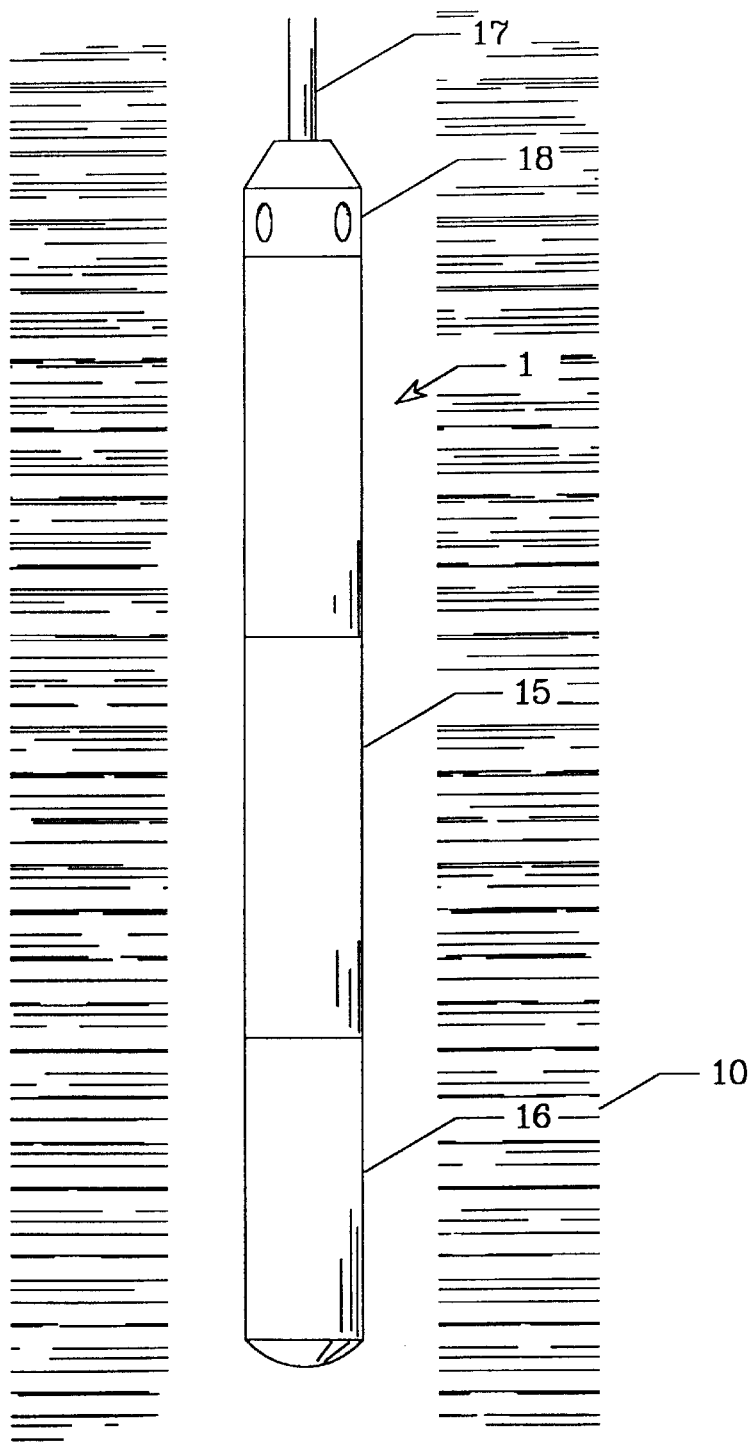
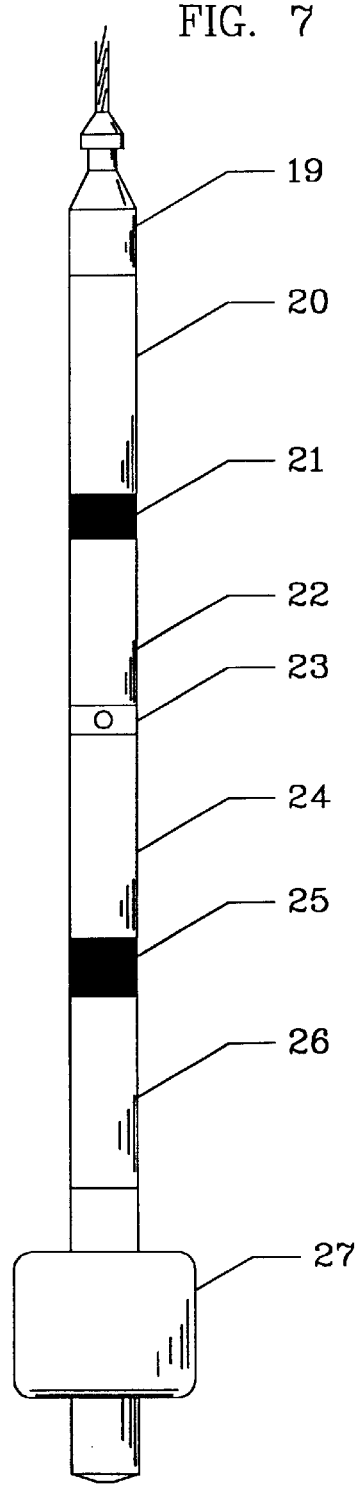

FIG. 13

PROGRAMMING OUTLINE

PRIMARY INITIAL EVENT (one only)
   time / specific beacon / type of conveyance maneuver /
    pressure / borehole inclination / none / other SECONDARY INITIAL EVENT (one only)
   time / specific beacon / type of conveyance maneuver /
    pressure / borehole inclination / none / other CONTINUING ACTION
   count casing collars / identify beacons / power auxiliary
    sensors / identify benchmarks / record data / other PROCEDURAL EVENTS
   type of conveyance maneuver / pressure / temperature /
    number of casing collar passages / time / borehole
    inclination / recognized specific beacon / none / other CONDITIONAL EVENTS
   pressure / temperature / inclination of probe /
    depth decreasing / probe velocity / none / other PRE-ACTUATION
   signal / device on / none ACTUATION
   device on-signal physical device / guns fire
    device on-signal another probe / none / other FINISH (one only)
   loop / end

---

SIGNAL TRIGGERS (signals surface at these times)
   initiations / completions / none / other SENSOR RECORD TRIGGERS
   time intervals / passage events / distance intervals TRIGGER DEPTH
   X feet

REMOTE SENSING AND MEASUREMENT OF DISTANCES ALONG A BOREHOLE

CROSS-REFERENCE TO RELATED APPLICATION

This is a continuation-in-part of U.S. Provisional Patent application Ser. No. 60/216,730, filed Jul. 7, 2000, and entitled Remote Sensing and Measurement of Distances Along a Borehole.

TECHNICAL FIELD

The invention relates generally to borehole probes of the type used to perform tasks or acquire data within the borehole. More particularly the present invention relates to probes that enable improved determination of probe depth information.

BACKGROUND AND SUMMARY OF THE INVENTION

Downhole operations of the type practiced in the oil and gas exploration and recovery industries typically utilize probes to gather information and/or perform desired functions or operations in cased and open boreholes. In such operations, it is important to have depth information so that the data gathered can be known with respect to the depth from which the data was obtained or so that an operation can be performed at a desired depth.

Wireline probes are in communication with surface instrumentation, wherein the probe is conveyed into and out of the borehole using electric wireline. Other probes, such as the type conveyed on drill pipe or remote probes, are generally self-powered and are not in communication with surface instrumentation. In each case, however, improvement in obtaining depth information is desired.

Accordingly, the invention relates to probes for traversing a borehole having a plurality of benchmarks located therein at known depths.

In a preferred embodiment, the probe includes at least one pressure vessel having a depth reference point and depth determining devices associated with the vessel for enabling determination of data corresponding to the instantaneous depth of the depth reference point of the pressure vessel.

In a preferred embodiment, the depth determining devices include a clock, and computer memory for storing depth information corresponding to the depths of the benchmarks. A first sensor senses the benchmarks within the borehole relative to the depth reference point of the pressure vessel and generates output data corresponding to the identity of the sensed benchmarks. A comparator compares the sensed benchmark identification data to the stored depth information to match the sensed benchmark identification data to corresponding benchmark depths and generates signals corresponding to the depth data of the depth reference point of the pressure vessel at the time of passage of the depth reference point of the vessel. A second sensor senses the displacement of the depth reference point of the pressure vessel relative to each benchmark and generates output data corresponding to the displacement of the depth reference point of the pressure vessel relative to the most recently sensed benchmark. An analyzer analyzes the depth data of the most recently sensed benchmark and the output data corresponding to the displacement of the reference point of the pressure vessel relative to the most recently sensed benchmark to yield data corresponding to the instantaneous depth of the depth reference point of the pressure vessel.

In yet another aspect the invention relates to a method of determining the instantaneous depth of a probe in a borehole.

In a preferred embodiment, the method includes the steps of sensing the presence of a downhole benchmark having a known depth, sensing the displacement of the probe relative to the benchmark relative to the time of passage, and combining the displacement of the probe with the known benchmark depth to yield the instantaneous depth of the probe.

BRIEF DESCRIPTION OF THE DRAWINGS

FIG. 6 shows a simplified schematic of a probe with coiled tubing for logging open hole.

FIG. 7 shows sections of a probe assembly.

FIG. 13 shows a programming outline for the probe as performed by a personal computer.

DETAILED DESCRIPTION OF PREFERRED EMBODIMENTS

Turning now to FIGS. 1–13, there are described various probe configurations in accordance with the invention. The invention provides probes suitable for recording data and/or performing functions in a cased or open borehole. The probes may be configured so as to be in data communication with surface equipment. In other embodiments, the probes are preferably configured so as not to be in data communication with the surface. For example, the probes may be remote self-propelled probes, probes conveyed on drill pipe or the like, or probes conveyed using wireline.

FIGS. 1–6, described in more detail below, show various aspects of probe conveyance and interaction between the probes and the borehole in accordance with the invention.

In preferred embodiments, probes in accordance with the invention utilize benchmark sensing devices to identify downhole benchmarks that, when correlated to previously obtained benchmark depth data (such as wireline logs), enable substantial determination of probe depth at the time of benchmark passage. The probes also preferably include additional displacement sensing devices such as an on-board inertial sensing device to sense the displacement of the probe from the most recent benchmark to supplement the depth information determined using the benchmark sensing devices. The effect of this is to yield highly precise remotely derived depth information.

In a preferred embodiment, the benchmark sensing devices are passive radio identification devices (PRIDs) installed within the borehole, such as in the casing or other tubulars, or other signal or energy emitting devices intentionally located within the borehole formation, such as radioactive bullets. While PRIDs and radioactive bullets are preferred benchmark sensing devices, it will be understood that other stationary devices or borehole features, such as casing collars, having fixed positions of known depth and that can be uniquely identified or sensed by sensors or otherwise detected may be used as a benchmark. For ease of reference, PRIDs may sometimes be referred to herein as "beacons."

Figure 11:
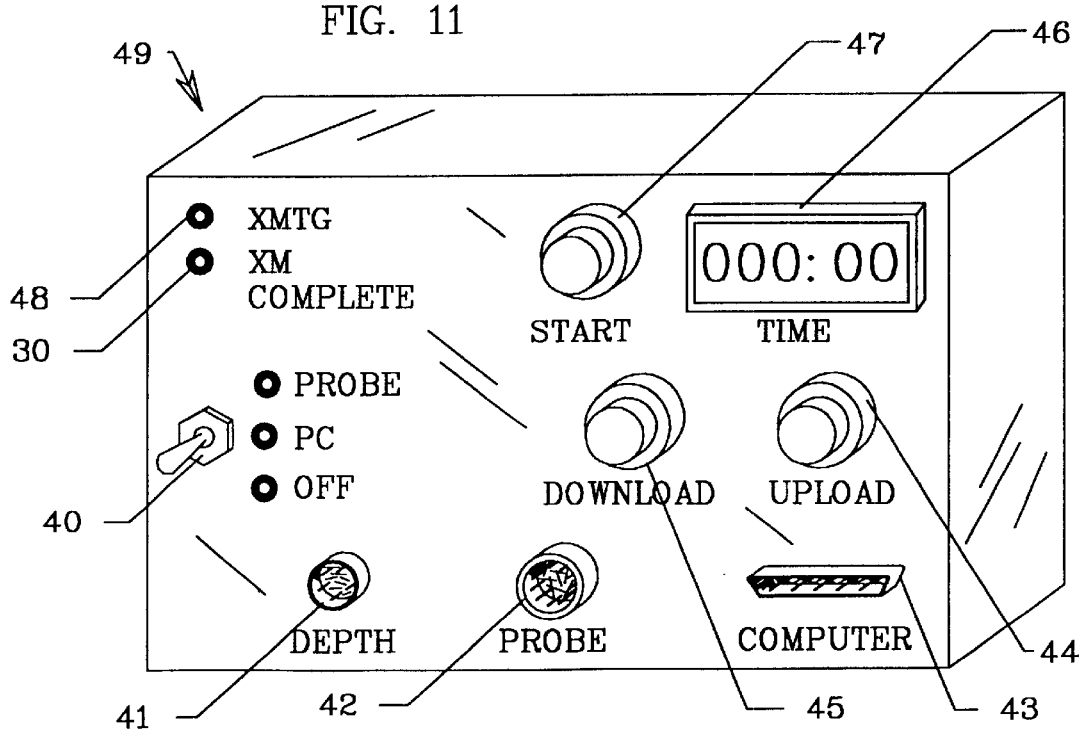
FIG. 11 shows the exterior of an interface box for use with the probe assembly.

In FIG. 7, there are shown the various sections that make up a preferred probe assembly 1. These sections may include a wireline head 19 that adapts the probe assembly to wireline, such as oilfield logging wireline. Signal section 20, which can take several forms and whose signal may take different forms depending on the application, has the purpose of signaling the surface with basic information. A first casing collar locator and beacon antenna sub 21 senses the passage of casing collars and/or the passage and identification of beacons. Battery section 22 provides power for probe operation. Load sub 23 is used to download and upload data from interface box 49 (FIG. 11). LIM section 24 preferably contains inertial measurement, logical, data storage, and instrument and electronic power functions. A second casing collar locator and beacon antenna sub 25 may additionally be included to detect or sense the passage of casing collars and/or the passage and identification of beacons, and may also contain sensors for external pressure and temperature. Auxiliary sensor section 26 is preferably a formation sensor powered by the battery section 22. Data generated by the sensor section 26 is preferably stored within the probe. A physical device 27 which may be a mechanical device or another probe, is in electrical communication with the probe 1 for receiving power and commands. For example, the physical device 27 may be a formation testing tool, a perforating device or other tool capable of performing a desired logging task.

In a preferred embodiment, the probe 1 includes the antenna sub 21, the battery section 22, the load sub 23, and the LIM section 24. The addition of further sections, such as the signal section 20, auxiliary sensor 26, and the physical device 27 enhance the number and type of operations that may be performed by the probe 1. The second sub 25 is also preferably included to facilitate the obtaining of additional speed and related information.

A conveyance attachment such as the wireline head 19 or probe conveyance sub 35 (FIG. 5) enables connection of the probe 1 to a conveyance device, such as wireline, tubulars, drill pipe, and the like for conveyance of the probe 1 within the borehole.

Figure 10:
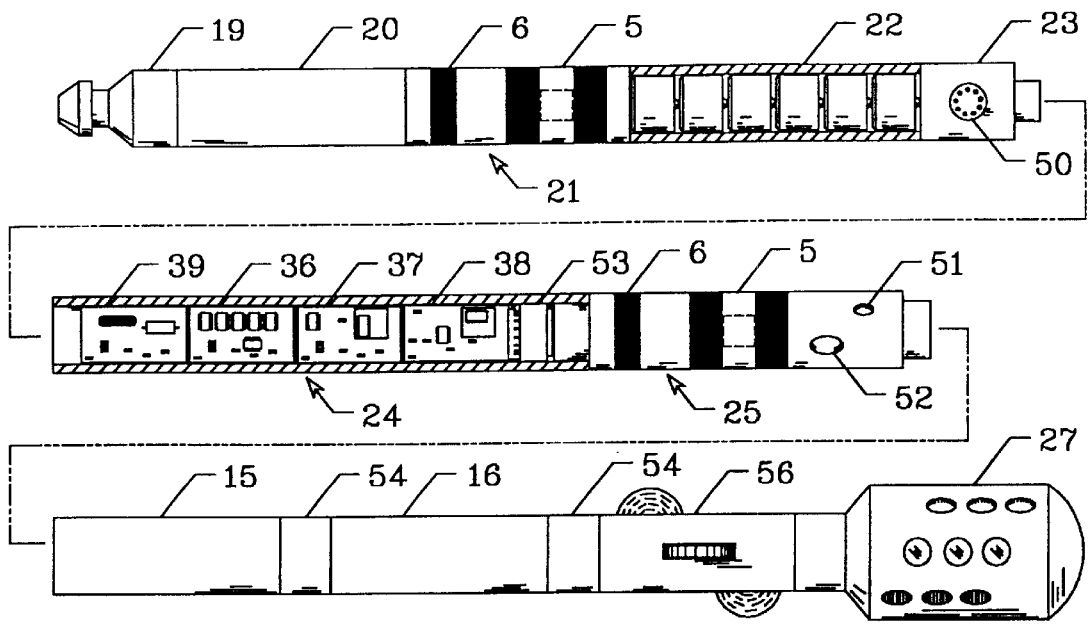
FIG. 10 shows a physical layout of the probe assembly.

For the purpose of example, preferred components of the various sections of the probe can be seen in FIG. 10. In this figure the first antenna sub 21 can be seen to be made up of a probe beacon antenna 6 (ANT2) above and a casing collar locator 5 (CCL2) below. The casing collar locator 5 is preferably provided as by two permanent magnets with a wire coiled core between, as shown schematically.

With further reference to FIG. 10, the battery section 22 can be seen to be made up of individual cells. The cells are preferably of lithium ion chemistry and assembled into a battery module. The load sub 23 preferably has an exposed electrical interface connector 50 attachable to probe connector 42 (FIG. 11). The interface connector 50 is preferably recessed into the body of the sub and a sealing plug placed over it during conveyance.

As also seen in FIG. 10, the LIM section 24 is preferably made up of five distinct components. Power board 39 transforms battery power into power suitable for the electronics of the LIM section, and for the accelerometer of the LIM section. All of the other sections of the probe assembly, such as the signal section and auxiliary sensors, may be provided unregulated battery power as directed by the logic board. Memory board 36, also seen in FIG. 9, stores program information and benchmark depth pairs given by the interface box and stores data provided by the probe's sensors. The logic board 37, also seen in FIG. 9 receives sensor information from the inertial board 38 and data from the memory board 36 to compare with program parameters, performs the logical decisions required by the program, triggers the memory board to log data, and powers and signals other sections of the probe assembly. The inertial board 38, also seen in FIG. 9 supports the transformation of accelerometer voltage output to distance information. Accelerometer 53 senses the steady local earth gravity in the direction of the longitudinal axis of the probe, and the dynamic accelerations, which the probe is subjected to.

The second antenna sub 25 (CCL2/ANT2/P/T) preferably includes a probe beacon antenna 6 (ANT2) above and a casing collar locator 5 (CCL2) below. The casing collar locator may preferably be provided as by a pair of permanent magnets with a wire coiled core between, as shown schematically. Below the CCL are an external pressure (P) sensor 52 and a temperature (T) sensor 51.

Auxiliary sensors 15, 16, 56 are connected by conductor subs 54. These sections may be commercially available electric wireline formation sensors fitted with wiring for power and data transmission, such as, for example, a measuring wheel module producing distance measuring data from rotation caused by contact with the wall of the tubular or borehole.

For the purpose of example, physical device 27 is depicted in FIG. 10 as a perforating gun. However, it will be understood that this physical device may be another type of mechanical device, such as packer or valve, or a surface signaling device, or another probe to be signaled from or to the probe of the present invention.

After the probe is assembled with the section required to perform a desired function, a micro-processor, such as a personal computer, is used to define a logical program for the probe and to obtain benchmark depth data.

A preferred logical program definition is described in the programming outline of FIG. 13. To enable a desired flexibility of operations and retain a structured program, the following main steps preferably occur in probe operations. In this preferred embodiment, the steps are initial events, procedural events, conditional events, pre-actuation, actuation, and loop/end. Logging preferably occurs after the initial event and up to the time of the end step.

Figure 12:
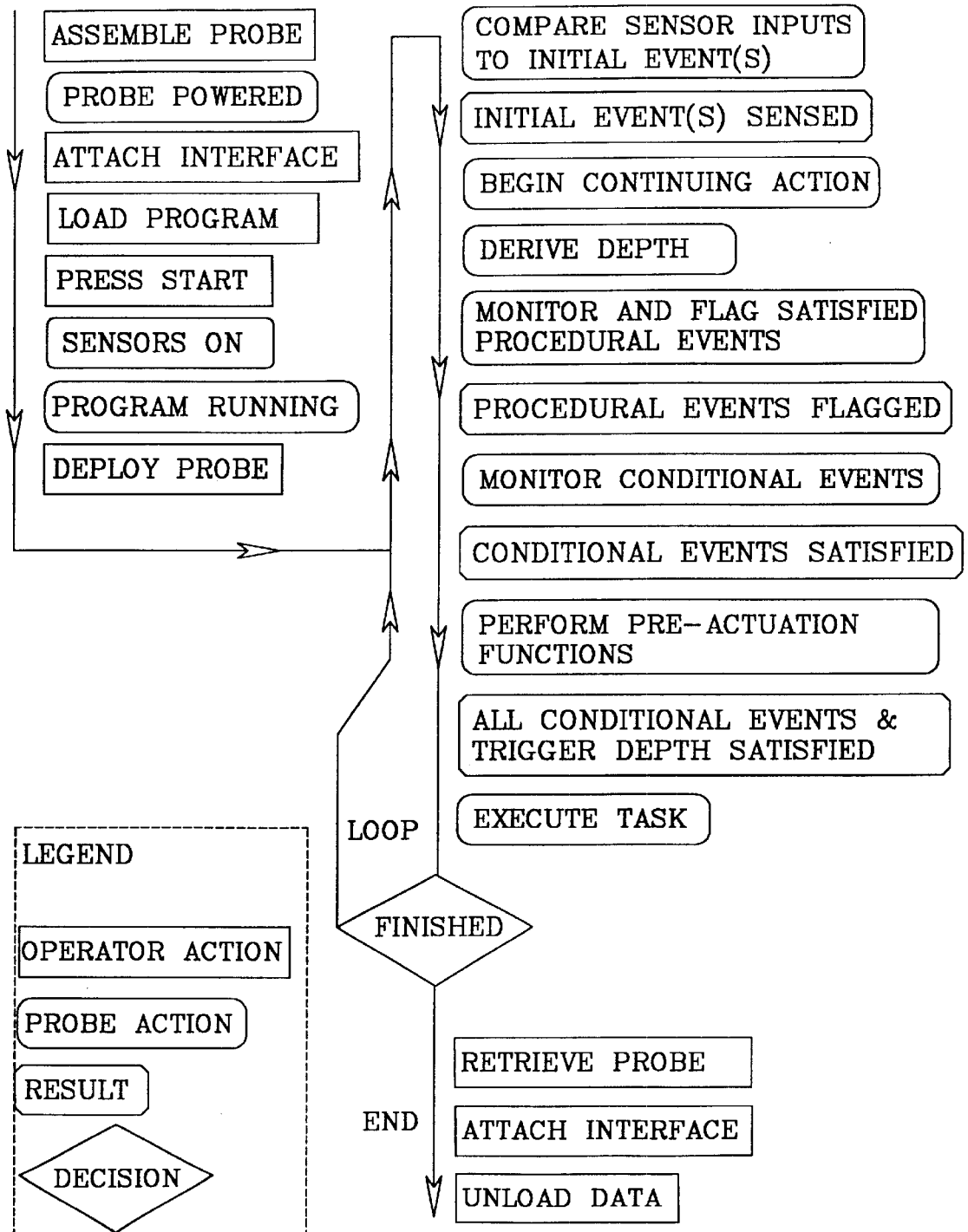
FIG. 12 shows a procedural schematic of the use of the probe.

A sequential flowchart can be seen in FIG. 12. Prior to the initial event, the probe preferably senses but does not record data. When the programmed primary and secondary initial event are sensed, the probe begins the procedural phase concurrent with the continuing action. If logging (recording sensor data) is a continuing action, the auxiliary sensors will-be powered at this time, and a sensory record will be stored at sample intervals determined by the sensor record trigger (e.g. log every foot). In the procedural phase, the probe compares sensed data to procedural events. Satisfaction of each procedural event occurs if the sensed data meets the pre-programmed criteria at least once during this phase. After satisfaction of all procedural criteria, the probe proceeds to the conditional phase. In this phase, the probe compares sensed data to the conditional events. When all programmed conditional events are satisfied at the same time, the sensor performs the pre-actuation actions. After performing these actions, the probe compares the instantaneous depth with the pre-programmed trigger depth. When all conditional events and trigger depth are concurrently satisfied, the programmed actuation will occur. After completion of the actuation, if the finish decision is to end, then power to the auxiliary sensors may be terminated. If the finish decision is to loop, the probe begins another programmed procedure.

The logical program allows very simple procedures and very complex procedures to be performed accurately and dependably. The program also allows signaling to the surface when certain conditions are met and when phases are completed.

After the operator has defined the logical program in the personal computer, the benchmark depth information is input.

The computer's connector port is connected to the interface box's computer connector 43 (FIG. 11) by use of a connector cable. Toggle switch 40 is placed into the PC position, and the download button 45 pressed. The personal computer is then made to transmit its logical program and benchmark depth information to the connector port. The interface box receives this information and stores it in RAM. The interface box is powered by on-board batteries, and so is self-sufficient and portable.

The probe is assembled from at least the minimum components of the probe proper. Upon assembly, the probe is powered by its battery section 22 (FIG. 10). Upon receiving power, the logic board microprocessor ROM instructs the microprocessor to expect a download of data.

As seen in FIG. 11, the interface box is then connected from probe connector 42 to the probe's interface connector 50 (FIG. 10) by use of a connector cable. The toggle switch 40 is placed into the probe position, and the download button 45 pressed. Digital electronic data will be transferred from the interface box's RAM to the logic board 37 (FIG. 10). The logic microprocessor retains the program information and transfers the benchmark information to the RAM of the memory board 36 (FIG. 10). While this is occurring, XMTG light 48 is illuminated. When data transfer is complete, the XM COMPLETE light 30 will illuminate. At this time the start button 47 may be pressed. The start button will reset the probe's and interface box's internal clocks to zero and maintain and display elapsed time 46. The interface box will then be disconnected from the probe, and the plug installed over the probe's interface connection 50 (FIG. 10).

The interface box may then be brought into physical proximity of the surface depth measurement system. It may be connected to an output from this measurement system, through the depth connector 41. The interface will record surface measurement system depth and time pairs and store these into an array in RAM. Notes on operation versus time may be kept by the operating personnel.

When the start button of the interface box is pressed, it also resets the logic board and interface box clocks to zero and maintains elapsed time in agreement with the downhole probe. After pressing the start button, the probe is checking for the primary initial event.

The function of the inertial board is preferably controlled by a microprocessor directed by ROM. Separate coprocessors may be used to process inertial algorithms in real time. The inertial board preferably performs the following functions at substantially all times, and performs them substantially concurrently. The inertial board corrects the analog voltage output with a temperature and voltage error model. The inertial board monitors the noise level of the accelerometer output to determine whether an inertially derived rest state exists. The inertial board transmits the existence of this pseudo rest state to the logic board, the logic board then uses other sensor flux rates to verify a qualified rest state, and if it is verified, transmits a corrected velocity of zero to the inertial board. The inertial board then sets its instantaneous velocity to zero, and compares the inertially derived velocity to the zero velocity given by the logic board and may use the error (difference) to correct its integration algorithm coefficients.

The inertial board extracts the steady state component of the accelerometer voltage output to find inclination and transmits the same to the logic board. The inertial board integrates the time variable component of the accelerometer voltage output from the time of station passage or initial movement after a rest state, and adds this amount to either the velocity calculated from station passage or the zero velocity of a rest state, to determine instantaneous velocity, and transmits same to the logic board. The inertial board integrates the instantaneous velocity to determine distance traversed, and transmits same to the logic board.

The logic board adds distance traversed to the last benchmark depth to yield instantaneous depth. The inertial board monitors CCL line current and determines a baseline noise level so as to determine pseudo CCL events (characteristic impulsive currents above the noise level) and transmits these inertial board derived CCL events to the logic board. The logic board then uses casing collar depth data from the memory board to compare to the instantaneous depth at the time of the pseudo CCL event, and if in agreement verifies a qualified casing collar passage, and uses this for sampling purposes or as a benchmark. If used as a benchmark, the logic board resets the inertial board instantaneous distance to zero. The logic board may use these non-depth qualified pseudo events (considering them fixed magnetic anomalies) to correct its instantaneous velocity.

The inertial board receives an updated velocity value from the logic board determined from the time interval of beacon or casing collar passage past the antenna subs and may use the error (difference) to correct its integration algorithm coefficients. The inertial board receives commands from the logic board to reset distance to zero after benchmark passage. Meanwhile, the logic board is supporting the inertial board as described above, and monitoring sensor information and comparing it to the programmed initial event. It is using the beacon and collar passage events to correct velocity for the inertial board.

After the primary initial event is sensed, the microprocessor goes on to the secondary initial event. When this is satisfied, the microprocessor enters the procedural phase concurrent with the continuing action phase. Typical criteria for the initial event can be seen in FIG. 13.

In the continuing action phase, which begins after initial event satisfaction and continues through the loop or ends at finish, the logic microprocessor performs the following activities at substantially all times and substantially concurrently.

If benchmarking with casing collars is a continuing action, the logic microprocessor will use qualified casing collar events as benchmarks.

If benchmarking with beacons is a continuing action, the logic microprocessor will monitor ANT1 and ANT2 events. The positive identification of a beacon will cause the microprocessor to retrieve its associated depth stored in the memory board and to consider this the instantaneous depth at the time of beacon passage. The velocity derived from the passage of the beacon at ANT1 and ANT2 may be given to the inertial board as a corrected velocity. The instantaneous distance of the inertial board would be reset to zero.

If neither beacon or casing collar benchmarking is taken as a continuing action, the logic board considers the initial event as zero depth, and derives instantaneous depth from the instantaneous distance value provided by the inertial board. It may correct velocity based on casing collar and/or beacon passage. When the logic board decides that a qualified rest state has occurred, velocity will be reset to zero.

If counting casing collars is taken as a continuing action, the logic microprocessor will count qualified casing collar passages.

If powering auxiliary sensors or devices is a continuing action, the logic microprocessor will direct battery power to those sensors.

If recording sensor data is selected as a continuing action, the logic microprocessor will use distance intervals, time intervals, and/or passage events as logging triggers. When triggered, the logic board sends a snapshot of the instantaneous depth, time, sensor data, and type of trigger.

Coincidental with the continuing action, the logic microprocessor compares sensor data to the programmed procedural events. It flags those events as they occur. FIG. 13 shows examples of typical procedural events. When all programmed procedural events are flagged, the microprocessor continues to the conditional phase. The logic microprocessor maintains the continuing actions during the conditional phase.

During the conditional phase, the logic microprocessor monitors sensor data and compares it to the conditional criteria. When all of the conditions are met concurrently, the microprocessor enters the pre-actuation phase.

Upon entering the pre-actuation phase, the logic microprocessor may signal the surface by powering the signal section of the probe, if that is selected during the programming phase. If employing a detonating device is the eventual actuation event, at this time it will power the DEVICE ON line seen at the left of FIG. 9. At the time of detonation, which will occur when trigger depth is reached, the GUNS FIRE line will be used to fire the detonator. The two lines improve safety greatly by separating functions and allowing time and energy safety barriers to be overcome before the detonators are allowed to fire. In employing a non-detonating device is the eventual actuation event, it is anticipated that neither line will be energized at this time.

During the pre-actuation phase, the microprocessor waits for the instantaneous depth to agree with the programmed trigger depth. When depth agreement occurs while all the conditional criteria are being met, actuation occurs.

Actuation may consist of energizing the GUNS FIRE line to fire a detonating device, or energizing the DEVICE ON line to power a physical device or to signal another probe.

After actuation, two possible actions can occur: finish or loop. If finish was programmed, the microprocessor may or may not cease powering the auxiliary sensors or devices, may or may not discontinue logging and depth measurement, and will wait for upload. If loop is programmed, the state of the auxiliary lines may continue, logging and depth measurement may or may not continue uninterrupted, and the microprocessor will perform based on the second programmed instructions.

Referring to FIG. 11, after the probe has performed its tasks, it is preferably conveyed to the surface. At the surface, the interface connector plug is removed. The probe's interface connector 50 (FIG. 10) is then connected to the interface box's probe connector 42 of a connector cable. The toggle switch 40 is placed into the probe position, and the upload button 44 pressed. Digital electronic data will be transferred from the memory board RAM through the logic board into the RAM of the interface box. While this is occurring, the XMTG light 48 is illuminated. When data transfer is complete, the XM COMPLETE light 30 will illuminate. The interface may then be disconnected from the probe, and the plug installed over the probes' interface connection 50.

The interface box's computer connector 43 (FIG. 11) is connected to the computer's connector port through a connector cable. The toggle switch 40 is placed into the PC position. The personal computer is made ready to receive the data, and the upload button 44 pressed. The logged information in the interface RAM is transferred to the personal computer through its connector port. The recorded downhole data may be saved or otherwise recorded, presented in charts or graphs or the like or otherwise stored, presented, or transmitted.

UTILIZATION OF PREFERRED EMBODIMENTS

Figure 4:
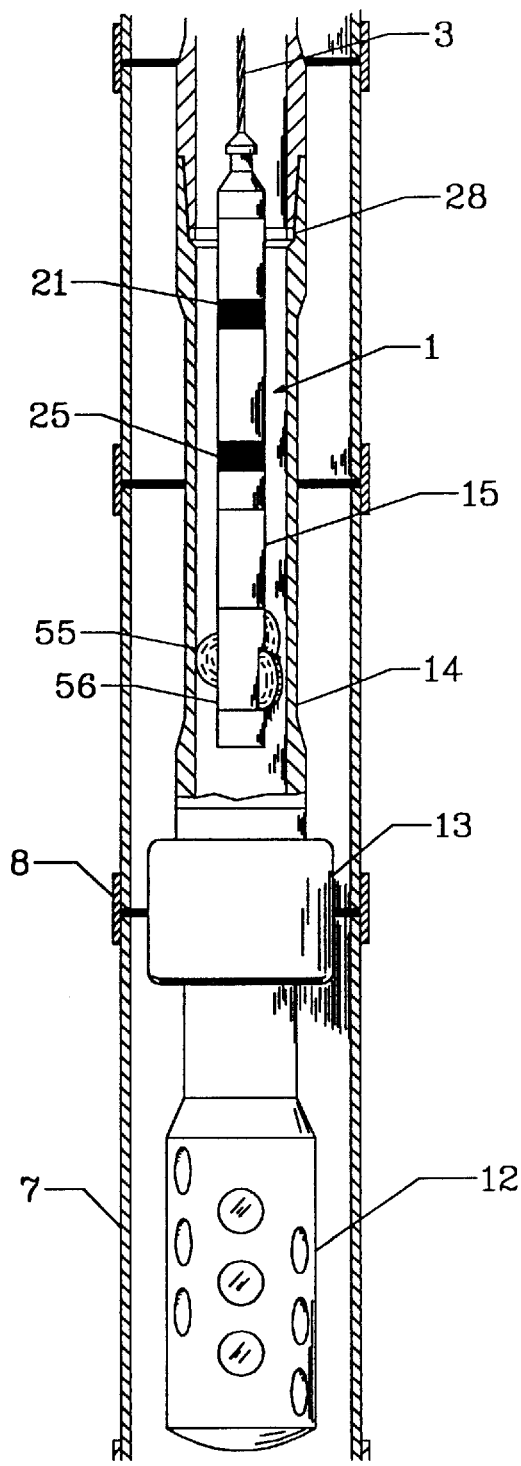
FIG. 4 is a simplified schematic of the probe of FIG. 1 with wireline conveyance and wheeled distance measurement method in a tubing conveyed perforation, shoot, and produce.
Figure 5:
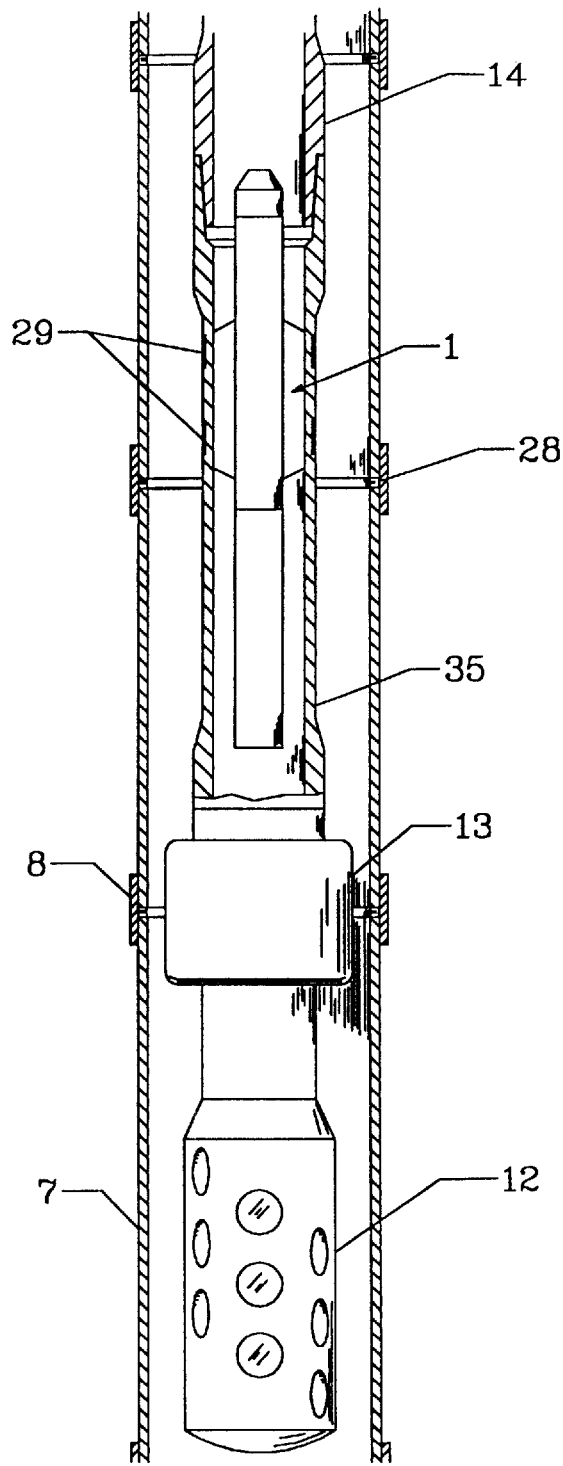
FIG. 5 is a simplified schematic of a probe with tubular conveyance in a tubing conveyed perforation, shoot, and release.
Figure 8:
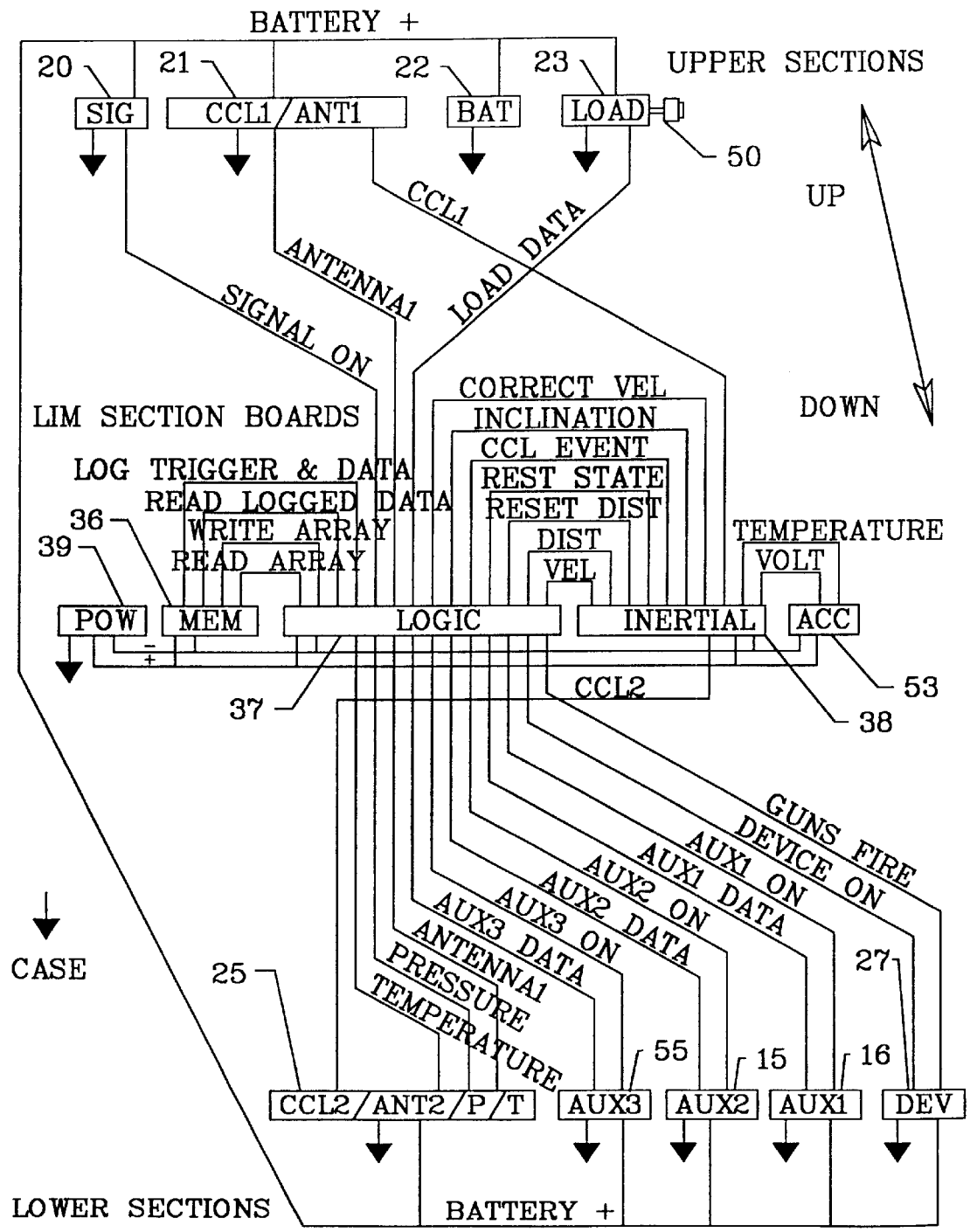
FIG. 8 shows a functional wiring diagram for the probe assembly.
Figure 9:
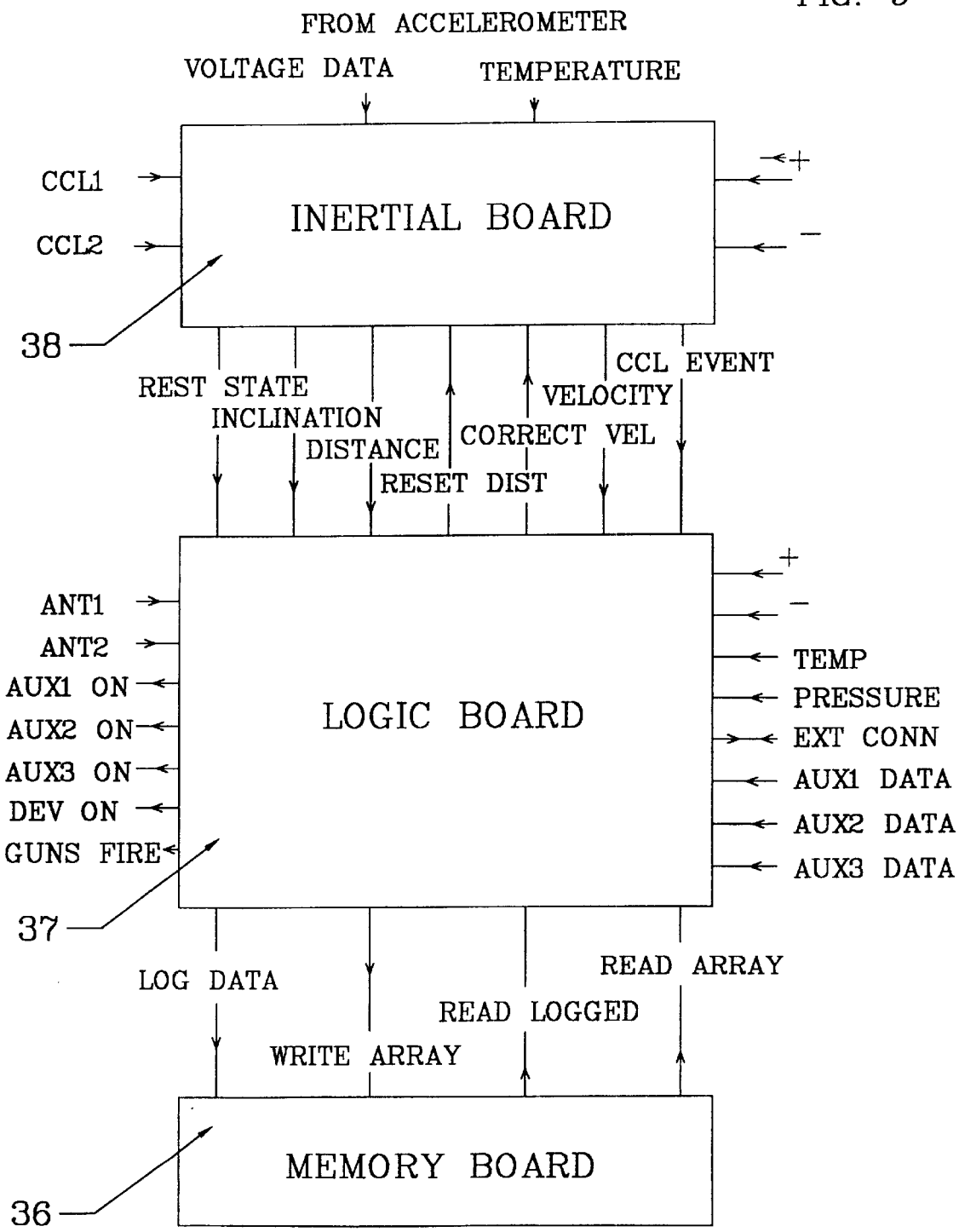
FIG. 9 shows inertial, logic, and memory printed circuit board outlines with interconnects and external connections.

A tubing operation is seen in FIG. 4, with probe assembly 1 conveyed by wire 3 to correlate the relative position of the tubing 14 and the desired stratum of interest. A tubing operation is seen in FIG. 5, with probe assembly 1 conveyed with the tubing 14 to correlate the relative position of the tubing and the desired stratum of interest.

Equipment may be conveyed into the borehole, for example, by coiled tubing, a continuous steel tube that is unreeled from a spool at the surface and forced into the borehole. FIG. 6 shows probe assembly 1 being conveyed through open borehole 10, by coiled tubing 17 through the use of a circulating adapter or sub 18.

Figure 1:
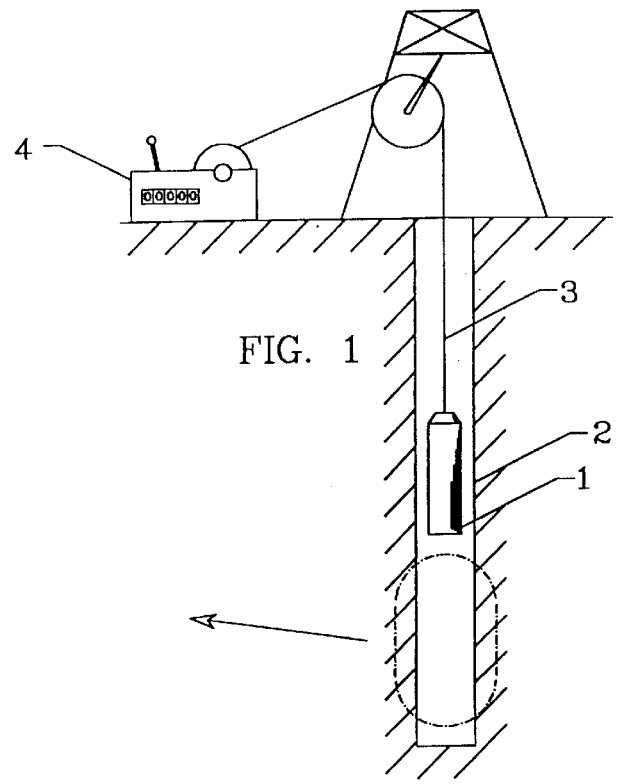
FIG. 1 is a simplified schematic of one embodiment of a probe in accordance with the invention being conveyed into a jointed or cased borehole by wireline.

As seen in FIG. 1, equipment may be conveyed into the borehole 2 by wire in the form of electric wireline. An operator controls the winch 4 at the surface of the earth above the borehole. The winch employs a depth measurement system and depth indication. The conveyance is made possible by the weight of the probe assembly 1 being supported by the wire 3 in tension.

Figure 2:
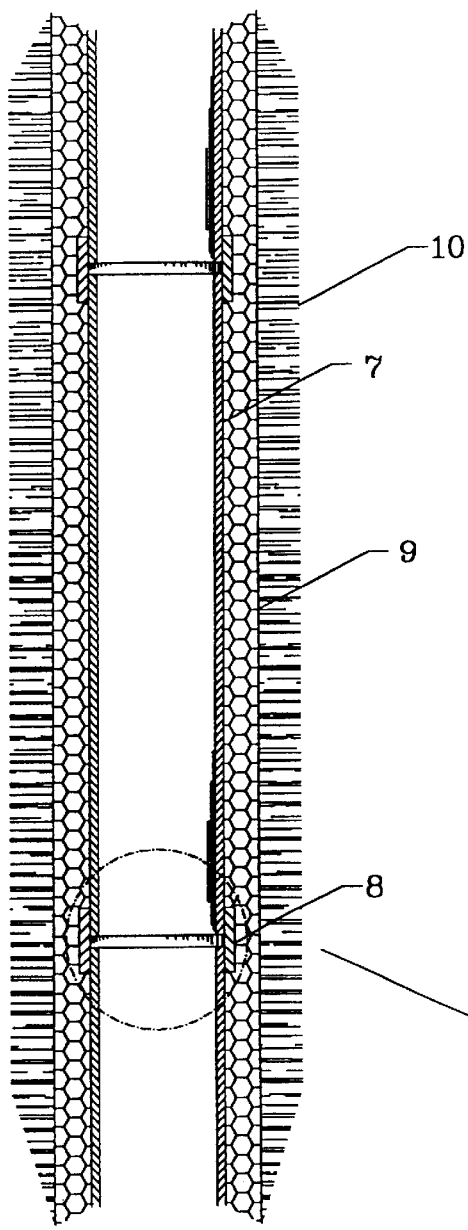
FIG. 2 is an enlarged cross-sectional view of a portion of the borehole of FIG. 1.

Seen in FIG. 2 is a typical borehole having casing joints or segments 7 connected by unions or casing couplings/collars 8 secured as by cement 9 within the borehole 10. The union of the tubing segments forms a ferromagnetic discontinuity which can be sensed by use of a casing collar locator (CCL).

Figure 3:
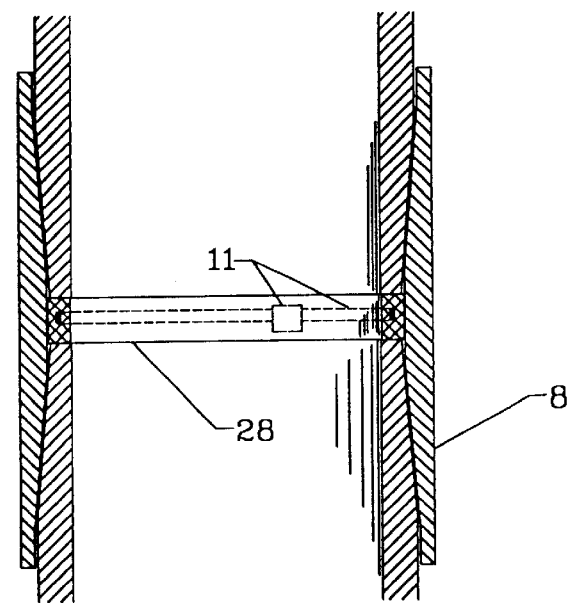
FIG. 3 is an enlarged view of a casing union portion of FIG. 2, showing placement of a beacon device for use with the probe of FIG. 1 in accordance with the invention.

FIG. 3 shows an alternative method of sensing the union, by placing a beacon 28 consisting of a passive chip and concentric antenna 11 into the unused space between the casing segment ends. The segments 7 and unions 8 shown are typical construction, however there are other known manners of connecting segments together which employ other beacon placement schemes. Preferred beacons are passive devices which respond to qualified electromagnetic signals in close proximity by producing electromagnetic signals identifying themselves uniquely by means of alphanumeric indicia. A preferred beacon system is described in U.S. patent application Ser. No. 09/286,650, filed Apr. 6, 1999, entitled "Method and Apparatus for Determining Position in Pipe", naming as inventor Joseph A. Zierolf, the disclosure of which is incorporated herein by reference in its entirety.

FIG. 4 shows an apparatus for accomplishing tubing conveyed perforation in accordance with the invention. As shown, perforating guns 12 and a packer 13 are conveyed at the end of a tubing string or column 14 column. Placement of the packer and guns at the proper depth (relationship of packer and guns to casing collars or formation of interest) in accordance with the invention may be accomplished as follows. After placing the packer and guns to approximately the correct depth, the probe of the present invention is placed into the tubular string and conveyed down to the top of the packer. The probe assembly is conveyed upwards while logging gamma information using a gamma sensor 15 and identifying tubular beacons 28 using probe sensors 21 and 25. This figure shows an alternative method of depth measurement, an auxiliary depth measurement sensor 56 using measuring wheels 55 in contact with the inside of the tubular string. After logging a short section, it is conveyed to the surface. At the surface, the logged data is uploaded from the probe to the interface box 49 (FIG. 11) and then uploaded from the interface to a personal computer. The personal computer displays the values of depth, time, tubing collar events, beacon identification, gamma radiation amplitude, pressure, and temperature in a manner easily facilitating interpretation of the depth relationship between the formation of interest and the position of the tubular beacons. This recorded relationship is used to find the error of placement of the packer and guns, so that they may be conveyed a short distance to be positioned correctly prior to activation.

FIG. 5 relates to another tubing conveyed perforation procedure in accordance with the invention. In this case the probe is not conveyed by wireline, but is an integral part of a short tubing sub or joint 35 having external beacon and CCL sensors 29. The probe is conveyed downhole as part of the tubing string. The procedure is substantially the same as described in connection with FIG. 4, except that after activating the packer 13 and guns 12, the tubing connection above the packer is disconnected and the tubing 14, including the short tubing joint 35, is conveyed out of the hole. This casing string 7 has couplings 8 and beacons 28 installed. Again, the task of the probe of the present invention is to place the packer and guns at the proper depth (relationship of packer and guns to formation of interest). When this short tubing joint is below the approximately correct depth, the tubing string is conveyed slowly up the borehole. When the probe senses itself at the correct depth by using identified beacon benchmark depths interpolated with inertial distance sensing, it can signal the surface so that the tubing conveyance can be stopped at the proper depth and the packer and guns actuated. As an alternative, when the probe senses itself at the correct depth, it can signal the packer and guns to actuate with no intervention from the surface personnel.

With reference to FIG. 6, shown is an open hole logging procedure in accordance with the invention. This procedure senses rock or formation properties in a borehole that does not contain casing and is a borehole, which, for a variety of reasons, would be undesirable to log using wireline (e.g. a high likelihood of the probe becoming stuck). The rock or formation of the borehole 10 is exposed to the probe 1, which has auxiliary sensors as part of the probe assembly, typically gamma sensor 15 and neutron/gamma sensor 16. The probe is attached to the end of the coiled tubing or other tubular conveyance by a circulating adapter 18. The conveyed tubing can reach sections of borehole too small, slanted, or too curved for other conveyance methods such as wireline, and the probe can log sensor data in relationship to depth.

In long sections of open hole special methods are used to facilitate accurate depth data in the absence of installed collars and beacons installed into collars. These methods may include ceasing the conveyance at intervals of time to reset measurement and integration errors to zero, the use of radioactive bullets embedded into the borehole rock, and the use of beacons embedded into the borehole rock. These embedded devices serve as benchmarks in the same fashion as benchmarks in cased hole. These benchmark devices may be embedded into the borehole rock prior to performing the procedures of the present invention by a system which carries beacons into the open hole, embeds these into the borehole wall at distance intervals, and establishes a benchmark depth for each embedded device.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A probe for traversing a borehole having a plurality of benchmarks located therein at known depths, the probe comprising at least one pressure vessel having a depth reference point and depth determining devices associated with the vessel for enabling determination of depth data corresponding to the instantaneous depth of the depth reference point of the pressure vessel, comprising a clock, computer memory for storing depth information corresponding to the depths of the benchmarks, a first sensor for sensing the benchmarks within the borehole relative to the depth reference point of the pressure vessel and generating output data corresponding to the identity of the sensed benchmarks, a comparator for comparing the sensed benchmark identification data to the stored depth information to match the sensed benchmark identification data to corresponding benchmark depths and generate signals corresponding to the depth data of the depth reference point of the pressure vessel at the time of passage of the depth reference point of the pressure vessel, a second sensor for sensing displacement of the depth reference point of the pressure vessel relative to each benchmark and generating output data corresponding to the displacement of the depth reference point of the pressure vessel relative to the most recently sensed benchmark, and an analyzer for analyzing the depth data of the most recently sensed benchmark and the output data corresponding to the displacement of the reference point of the pressure vessel relative to the most recently sensed benchmark to yield data corresponding to the instantaneous depth of the depth reference point of the pressure vessel.

2. The probe of claim 1, wherein the benchmark is a passive electrical device which responds to qualified electromagnetic signals in close proximity by producing electromagnetic signals identifying itself uniquely by means of an alphanumeric number.

3. The probe of claim 1, wherein the benchmark comprises a ring installed concentrically to the inside of a borehole tubular, the ring residing within a channel or groove indentation in the tubular interior where a concentric antenna is placed and embedded along the circumference of the concentric ring, the concentric antenna being electrically connected to a passive microchip.

4. The probe of claim 1, wherein the second sensor comprises an inertial sensor located on the probe.

5. The probe of claim 1, wherein the second sensor comprises measuring wheels positioned on the probe so as to contact the borehole and turn in response to displacement of the probe relative to the borehole.

6. The probe of claim 1, further comprising an additional first sensor and an additional second sensor.

7. A method of determining the instantaneous depth of a probe in a borehole, where the probe has a depth reference point and depth determining devices for enabling determination of depth data corresponding to the instantaneous depth of the probe depth reference point, the method comprising the steps of using a probe sensor for sensing the presence of a downhole benchmark having a stored known depth relative to the surface, sensing the displacement of the probe relative to the benchmark relative to the time of passage to yield a stored instantaneous relative depth, using a computer memory, clock and comparator for comparing the sensed benchmark presence data to the stored known depth in order to match the sensed benchmark presence data to the stored benchmark depth and generate signals corresponding to the depth of the probe depth reference point at the time of passage of the probe depth reference point, and using an analyzer for combining the stored relative instantaneous depth and displacement of the probe with the known benchmark depth to yield the instantaneous depth of the probe relative to the surface at any given time.

* * * * *